United States Patent [19]

Fukuda et al.

[11] Patent Number: 4,671,458
[45] Date of Patent: Jun. 9, 1987

[54] AIR CONDITIONING APPARATUS

[75] Inventors: Norisuke Fukuda, Tokyo; Yasuhito Sasaki; Fumio Watanabe, both of Yokohama, all of Japan

[73] Assignee: Kabushiki Kaisha Toshiba, Kawasaki, Japan

[21] Appl. No.: 832,421

[22] Filed: Feb. 24, 1986

[30] Foreign Application Priority Data

Feb. 25, 1985 [JP] Japan ................................. 60-35661
Sep. 30, 1985 [JP] Japan ................................ 60-214564

[51] Int. Cl.$^4$ .............................................. F24F 7/00
[52] U.S. Cl. .......................................... 236/49; 165/16
[58] Field of Search ................. 236/1 R, 1 B, 38, 49, 236/DIG. 9; 62/177, 186, 244; 165/16, 42, 43; 374/121, 124, 126, 128, 133

[56] References Cited

U.S. PATENT DOCUMENTS 3,948,154  4/1976  Asakai et al. ..................... 236/49 X
4,364,513  12/1982  Tsuzuki et al. ....................... 236/49
4,434,932  3/1984  Hara et al. ............................ 236/49
4,527,896  7/1985  Irani et al. ..................... 374/133 X

FOREIGN PATENT DOCUMENTS 57-210232  5/1974  Japan .
52-75480  12/1975  Japan .
52-75847  12/1975  Japan .
0095054  7/1980  Japan ................................. 236/1 R
0179528  11/1982  Japan ..................................... 236/49
0147635  9/1983  Japan ................................... 374/124

Primary Examiner—Harry B. Tanner
Attorney, Agent, or Firm—Cushman, Darby & Cushman

[57] ABSTRACT

In an air conditioning apparatus of the separate-type, an indoor unit is mounted on a wall of a room. The indoor unit is provided with an infrared ray detection unit which has an infrared ray sensor for sensing infrared rays, a temperature sensor for sensing a temperature in the detection unit, and a slit window for restricting a field of view of the detection unit. The detection unit is horizontally swung with a discharge opening of the indoor unit, from which warm or cold air is discharged, so that the room is swept by the field of view and the air. The room temperature distribution is obtained from the output signal from the detection unit and, the amount of the discharged air directed to the respective areas of the room is adjusted in accordance with the room temperature distribution.

9 Claims, 11 Drawing Figures

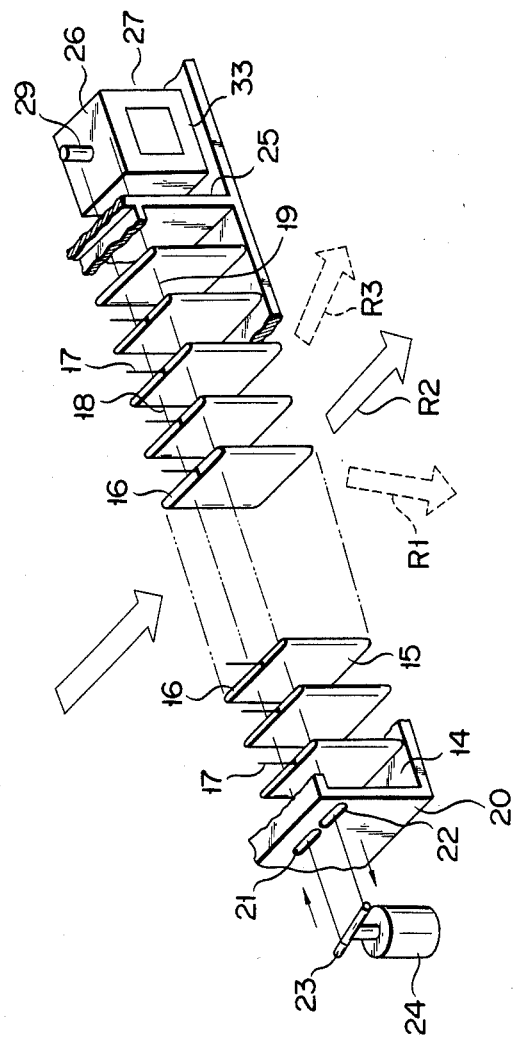

AIR CONDITIONING APPARATUS

BACKGROUND OF THE INVENTION

The present invention relates to an air conditioning apparatus and, more particularly, to an air conditioning apparatus which can maintain an indoor space air conditioned at a uniform temperature.

Comfortable indoor living is realized to a certain degree by using an air conditioning apparatus. Recent air conditioning apparatuses incorporate a humidity sensor in addition to a temperature sensor, both being controlled by a microcomputer to create a comfortable indoor environment. However, such conventional air conditioning apparatuses have several problems. In particular, a conventional apparatus for controlling room temperature at a desired temperature detects a temperature near the apparatus with a temperature sensor and controls the room temperature assuming that the detected temperature is an average room temperature. A semiconductor thermistor is conventionally used as the temperature sensor. With a thermistor temperature sensor, however, although room temperature near an air conditioning apparatus can be detected, temperature distribution in a particular area in the room cannot be detected. Generally, the temperature distribution is not uniform and varies greatly depending on a partition arrangement, partition members, and the like. As a result, when room temperature is controlled in accordance with the temperature detected near the air conditioning apparatus, temperature becomes nonuniform in respective areas of the room, and a comfortable overall temperature cannot always be obtained. This leads to inefficiency in cooling/heating. For example, assume that there is a man in a room to be cooled. Temperature will be higher near the man and lower in other areas of the room. When the temperature around the man is to be lowered, the temperature in the other areas are also lowered, inevitably resulting in inefficient operation.

SUMMARY OF THE INVENTION

It is an object of the present invention to provide an air conditioning apparatus which can uniformly cool/-heat all areas of a room, thereby providing a comfortable ambient temperature.

According to the present invention, there is provided a system for conditioning the air of a room, comprising means for generating warm or cold air and discharging the produced air in the room, means provided with a restricted field of view for sweeping the room within the restricted field of view, means for detecting thermal radiation from the room through the restricted field of view to generate signals which correspond to the temperature distribution of the room, and means for adjusting the warm or cold air directed to the room in accordance with the detection signals.

BRIEF DESCRIPTION OF THE DRAWINGS

FIG. 3 is a perspective view for schematically showing a louver structure and a detection unit of the indoor unit shown in FIG. 2;

DETAILED DESCRIPTION OF THE PREFERRED EMBODIMENT

Figure 1:
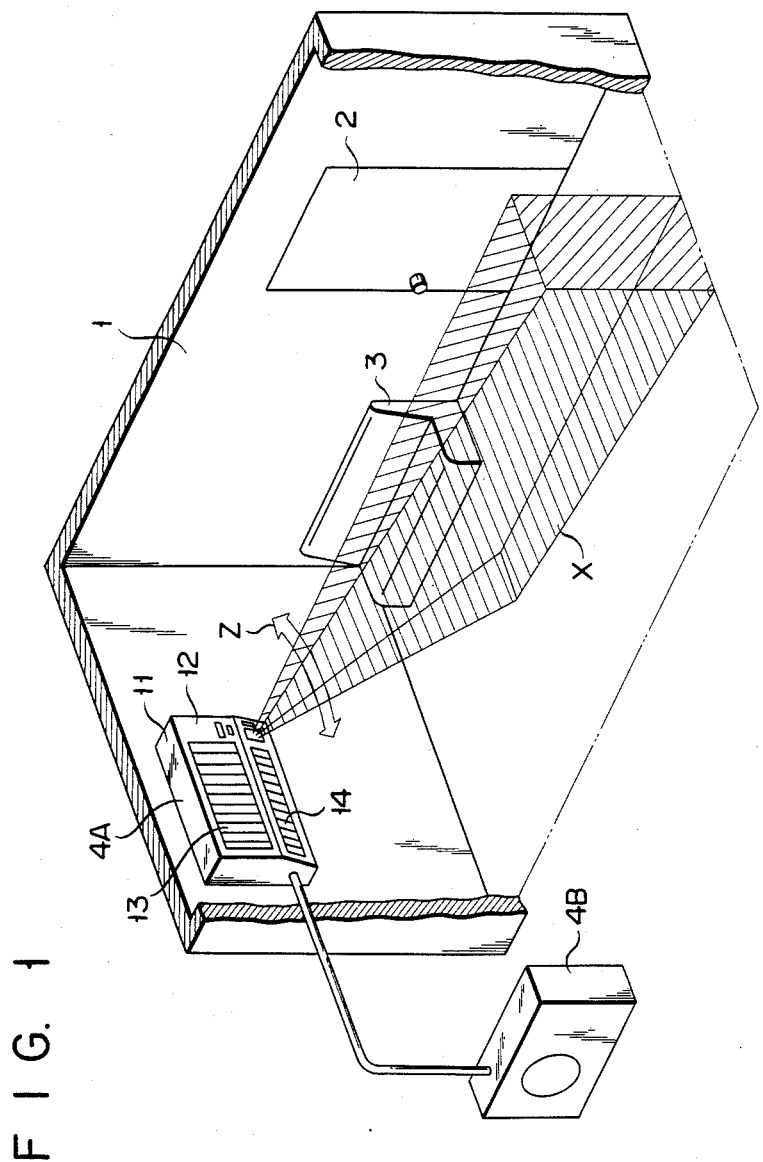
FIG. 1 is a perspective view of an air conditioning system according to an embodiment of the present invention installed inside and outside a room.

FIG. 1 shows an air conditioning apparatus according to an embodiment of the present invention installed in a room. In this embodiment, the present invention is applied to a so-called separate-type air conditioning apparatus having separated indoor and outdoor units serving as a cooler/heater.

Room 1 to be air conditioned is provided with door 2. Furniture 3 such as a sofa is placed in room 1. Indoor unit 4A of the air conditioning apparatus is mounted on a wall of room 1, and outdoor unit 4B of the apparatus is placed outside the room. Units 4A and 4B are coupled together with piping.

Figure 2:
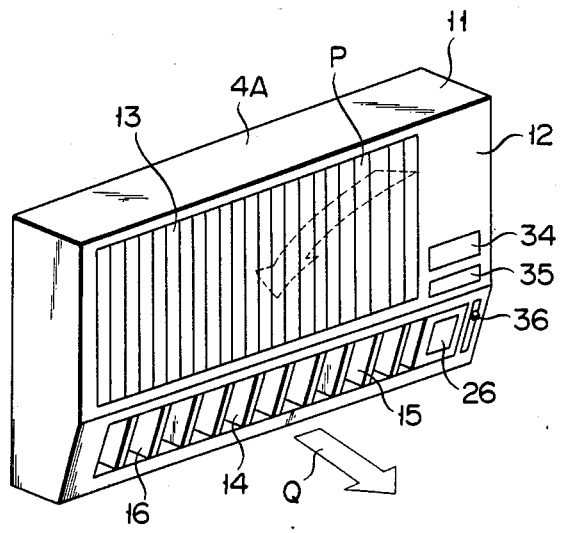
FIG. 2 is a perspective view of an indoor unit of the system shown in FIG. 1.

Unit 4A has substantially the same basic structure as a conventional apparatus, as shown in FIG. 2. More specifically, unit 4A has flat cabinet 11. Suction opening 13 for drawing in room air as indicated by arrow P is formed in an upper portion of front wall 12 of cabinet 11. Discharge opening 14 for discharging air as indicated by arrow Q is formed in a lower portion of cabinet 11. A filter is attached to opening 13, and a louver or adjustable bar grill 15 is attached to opening 14 such that its discharge direction can be changed horizontally. A fan for drawing air from and discharging it to the room, a motor for driving the fan, a heat exchanger for cooling/heating inlet air, a pan for collecting water condensed on the surface of the heat exchanger, a temperature control circuit 40 (to be described later) and so on are incorporated in cabinet 11. The heat exchanger is connected to outdoor unit 4B. As is well known, a compressor, a heat exchanger, an expansion valve and so on are incorporated in unit 4B.

Louver 15 is made of a plurality of straightening vanes 16, horizontally aligned to be parallel to each other, as shown in FIG. 3. Each straightening vane 16 is supported by corresponding pin 17 to pivot on a vertical axis. Upstream side ends of straightening vanes 16 are commonly connected to single wire 18, and downstream sides thereof are commonly connected to single wire 19. One end of each of wires 18 and 19 is connected to corresponding ends of lever 23 through elongated holes 21 and 22 formed in one side wall 20 defining opening 14. A central portion of lever 23 is coupled to a rotating shaft of step motor 24 through a reduction gear (not shown). When motor 24 rotates, respective straightening vanes 16 are pivoted about pins 17 and inlet air in cabinet 11 is discharged along a direction indicated by thick arrow R1, R2 or R3 in FIG. 3. The other ends of wires 18 and 19 are connected to infrared ray detection unit 26 through elongated holes (not shown) formed in the other side wall 25 defining opening 14.

Figure 4:
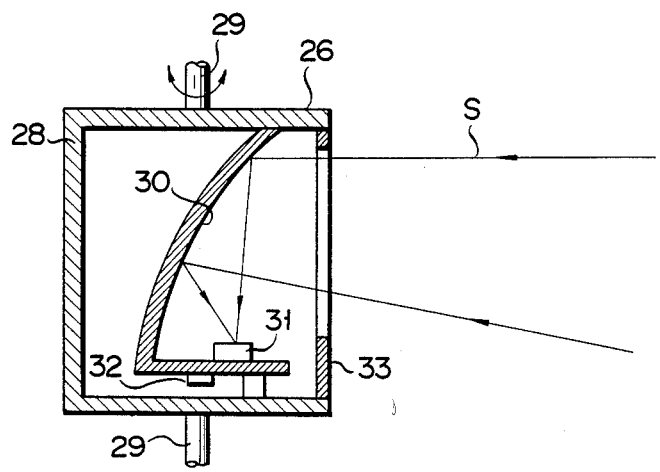
FIG. 4 is a schematic sectional view of the detection unit shown in FIG. 3.

Infrared ray detection unit 26 is housed in recess 27 having an opening facing forward on a lower portion of wall 12 of cabinet 11. Unit 26 has a circuit configuration as shown in FIG. 4. Specifically, case 28 having an opening facing forward is housed in recess 27. Shaft 29 supports case 28 and serves as a vertical axis around which case 28 is rotated, and is itself supported by a bearing (not shown). Concave mirror 30 is arranged in case 28 such that its concave surface opposes the opening of case 28. Infrared ray sensor 31 comprising a thermistor bolometer or a thermopile is arranged at a focal point of mirror 30. Temperature sensor 32 comprising a thermistor or the like for detecting the temperature of an area at which sensor 31 is located is arranged inside case 28. Window member 33 is provided in the opening of case 28. The other ends of wires 18 and 19 are connected to positions on an upper wall of case 28 to be symmetrical with each other about shaft 29. With this arrangement, when step motor 24 is driven, case 28 is swung around shaft 29, and a central axis of restricted field of view X of sensor 31 is horizontally pivoted as indicated by arrow Z in FIG. 1. The space in room 1 is thus horizontally swept by sensor 31.

LED 34 for displaying the time and other data is embedded in front wall 12 of cabinet 11, as shown in FIG. 2. Lever 36 is arranged at a side portion of unit 26 in order to vertically move unit 26 when output from sensor 31 is extremely small.

Figure 5:
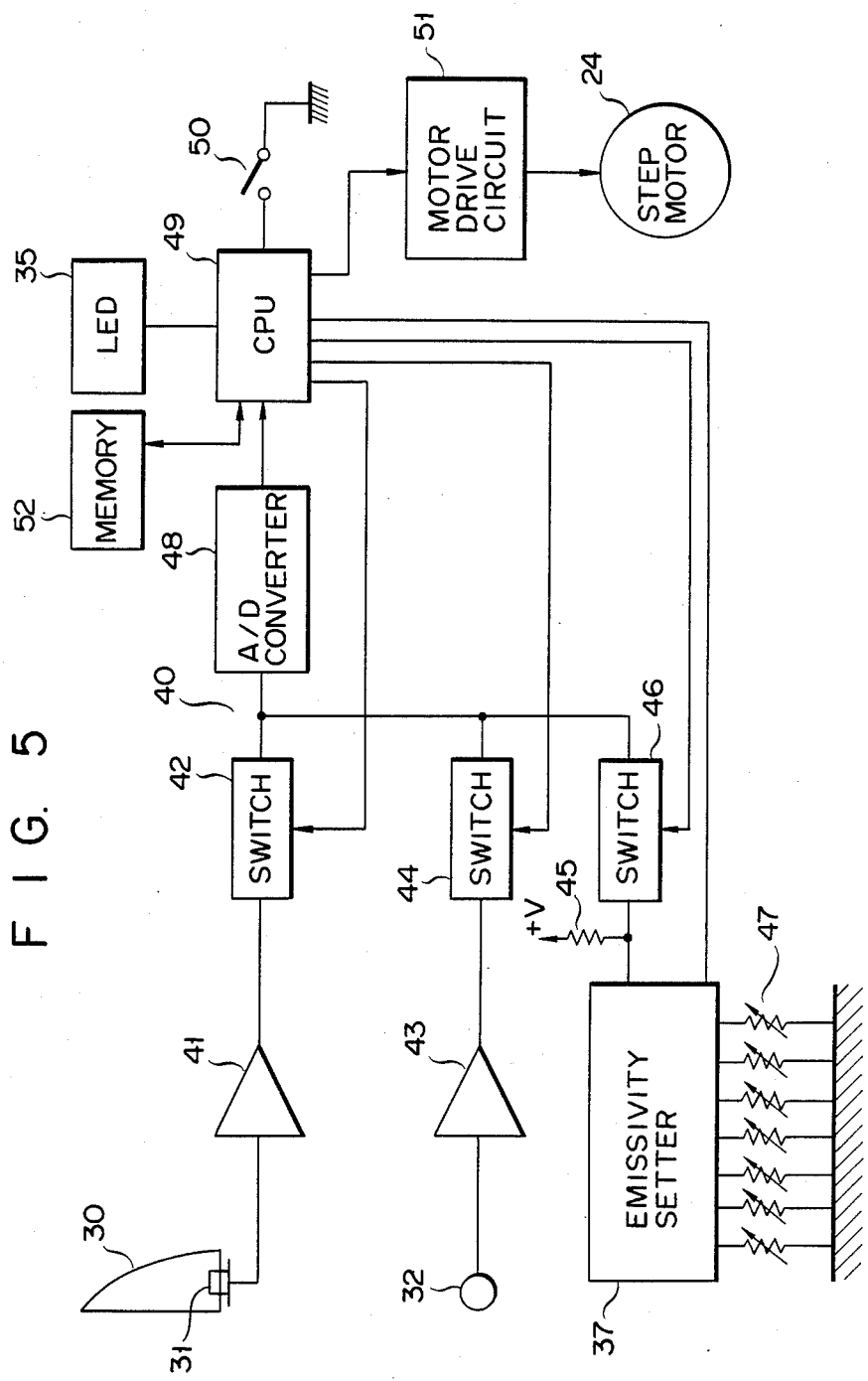
FIG. 5 is a block diagram of a temperature control circuit.

Sensors 31 and 32, LED 34 and step motor 24 are connected to temperature control circuit 40 shown in FIG. 5. In circuit 40, an output from sensor 31 is supplied through DC amplifier 41 to an input end of analog switch 42, which is turned ON/OFF by central processing unit (CPU) 49 to be described later. An output from sensor 32 is supplied through DC amplifier 43 to an input end of analog switch 44, which is also turned ON/OFF by unit 49. In this embodiment, the position of unit 26 is provided as a reference position, field X viewed from the, reference position is horizontally divided into a plurality of areas, e.g, seven areas, and infrared rays S received from the respective areas are detected independently by sensor 31.

Signals passed through switches 42 and 44 are supplied to unit 49 through analog/digital converter (A/D converter) 48. Unit 49 comprises, e.g., a microcomputer having operation and control functions. Unit 49 supplies a signal to motor drive circuit 51 to drive step motor 24 at a predetermined speed. Note that circuit 51 sequentially drives motor 24 such that unit 26 is oscillated from the first to seventh areas as the field of view, and then switches the drive direction of motor 24 such that unit 26 is oscillated from the seventh to first areas, i.e., returning to its initial position. While unit 26 sweeps the respective areas in the manner described above, unit 49 fetches outputs from sensors 31 and 32 through converter 48, calculates emissivity data of the respective areas from the fetched data, and displays the calculated data on LED 35. When a user adjusts variable resistors 47 of emissivity setter 37 for the respective areas so that LED 35 indicates 0, voltages across resistors 47 are read by CPU 49 through converter 48, and the read data is stored in memory 52 as correction data. When emissivity setting mode switch 50 is OFF, unit 49 calculates temperatures of the respective areas from outputs from sensors 31 and 32 and the correction data. Unit 49 then supplies a command signal to circuit 51 so that the drive speed of motor 24 is set in accordance with the temperatures of the respective areas. More specifically, when the apparatus is set in the cooler mode, motor 24 is driven at a low speed when unit 26 detects a high temperature area, and at a high speed when unit 26 detects a low temperature area. When the apparatus is set in the heater mode, a command signal is supplied to circuit 51 to drive motor 24 in the opposite manner.

The cooler mode operation of the air conditioning apparatus having the above arrangement will now be described.

Before operation, emissivity correction data is collected. Room 1 is closed off from outside air. The temperatures of respective areas of room 1 are set uniformly. Under this condition, switch 50 is turned off. In this case, the temperatures of ceiling, floor, wall and so on of room 1 are substantially the same, and temperature data obtained by detecting infrared rays from respective areas should be the same as the temperature data obtained by sensor 32. In practice, however, temperature data from detecting infrared rays is different from data obtained by sensor 32 depending on different emissivities or shapes of objects located in the respective areas. In order to compensate for this difference, resistances of resistors 47 of setter 37 corresponding to the respective areas can be adjusted while switch 50 is ON so that LED 35 indicates 0. The adjusted resistance data is stored as correction data for the respective areas in memory 52. If the arrangement of furniture and so on in room 1 remains unchanged, the emissivity setting operation must be performed only once at the time of installation of indoor unit 4A.

The temperatures of respective room areas are detected by sensor 31 using the following principle. Infrared ray energy received from a room area and converted by sensor 31 into an electric signal is generally approximated by the following equation:

$$q_{12} = \sigma \epsilon_1 F_{12}(T_1^4 - T_2^4) \cdot A_1 \tag{1}$$

where $\sigma$ is a Stefan-Boltzmann constant, $\epsilon_1$ is an emissivity (to emittance 1 of a black body), $F_{12}$ is a shape factor, $T_2$ is an ambient temperature, $T_1$ is a detected temperature of an object, and $A_1$ is an area of the object.

As is seen from equation (1), the energy incident on sensor 31 varies depending on an emissivity or reflectance inherent in the detected object. As a result, the output from sensor 31 varies.

When temperature V is detected by a temperature detecting system under this condition, V is generally given by:

$$V = Rv\sigma\epsilon_1 A_1 F_{12}(T_1^4 - T_2^4) + V_2 \tag{2}$$

where Rv is the sensitivity of sensor 31. In equation (2), $V_2$ must be set equal to $Rv\sigma\epsilon_1 A_1 F_{12}T_2^4$ so that V corresponds to an absolute temperature. Note that $T_1 \approx T_2$ at an operation start point of the apparatus. Therefore, output $VT_1 \approx VT_2$ at this point is:

$$VT_1 \approx VT_2 = Rv\sigma\epsilon_1 A_1 F_{12}T_2^4 \tag{3}$$

In equation (3), $VT_1 \approx VT_2$ is known and $T_2$ is known from the output of sensor 32. As a result, the value of $X = Rv\sigma\epsilon_1 A_1 F_{12}$ is obtained. In this embodiment, X of the respective areas is calculated as the correction data at the operation start point. In practice, the correction value is a general value, since it includes attenuation resulting from distance and the like. Even when correction is performed in this manner, the temperatures detected by sensor 32 do not always coincide with those of the respective areas. However, such noncoincidence is negligible compared with n (number of areas) when a temperature difference among the respective areas in the room is as low as ± several centigrade (°C.) before air conditioning since T is the fourth power of the absolute temperature, and the ratio thereof is considered.

Figure 6A:
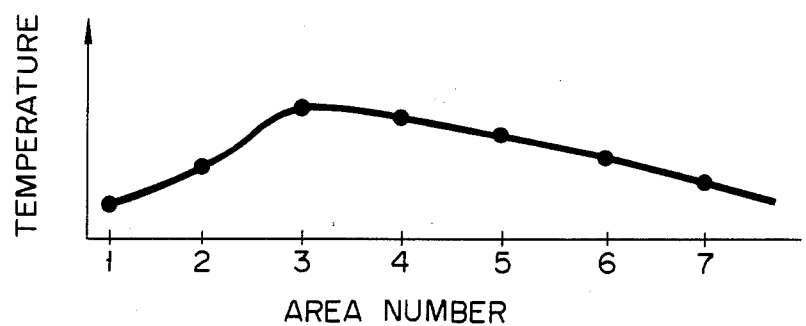
FIGS. 6A and 6B respectively are graphs showing temperatures of respective areas of a room and rates at which the louver sweeps the respective areas.
Figure 6B:
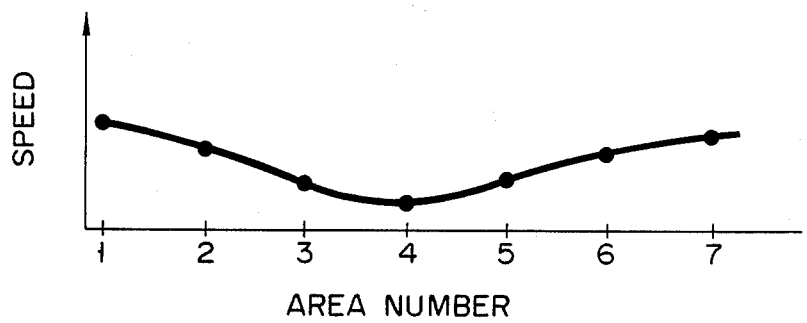

After emissivity setting is performed as mentioned above, switch 50 is turned off to start the temperature control mode. Unit 49 calculates temperatures of the respective areas from the outputs from sensors 31 and 32 and the calculated correction data. Temperature distribution in room 1 is thus obtained. When unit 26 sweeps a high temperature area in room 1, i.e., when air flow is discharged to a high temperature area through louver 15, unit 49 supplies a command signal to unit 51 so as to decrease the sweep speed of louver 15. When air flow is discharged to a low temperature area through louver 15, unit 49 supplies a command signal to unit 51 to increase the sweep speed of louver 15. FIGS. 6A and 6B show the relationship between detected temperature and sweep speed. In FIGS. 6A and 6B, the temperatures of areas 3, 4 and 5 are high and those of the remaining areas are low. Therefore, as shown in FIG. 6B, the sweep speed of louver 15 is low while air flow is discharged to areas 3, 4 and 5. With this temperature control, a large quantity of cold air is discharged to a high temperature area and a small amount of cold air is discharged to a low temperature area. As a result, the respective areas in room 1 are cooled to a uniform temperature.

Figure 7A:
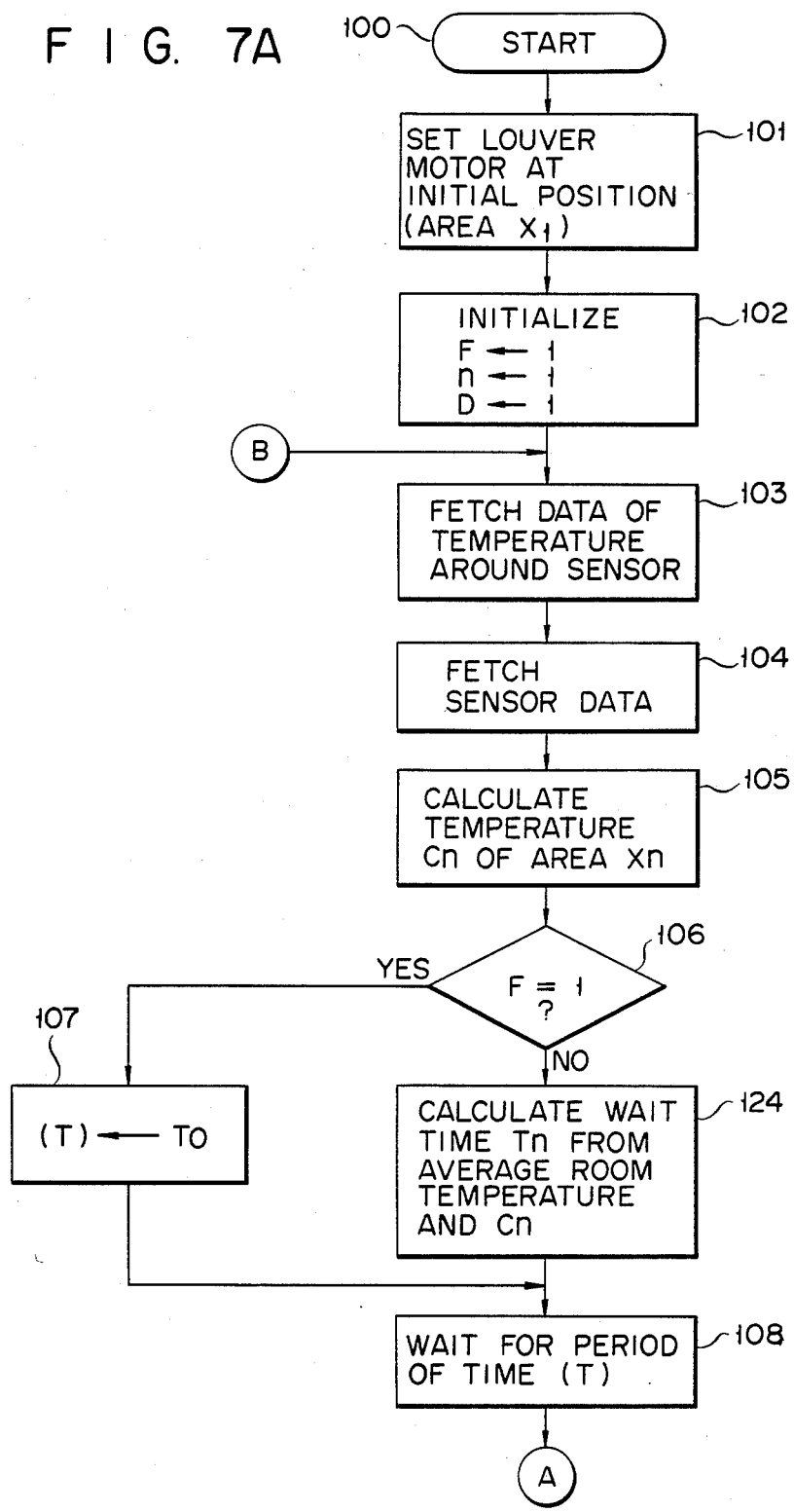
FIGS. 7A and 7B are flow charts showing an operation of the CPU shown in FIG. 5.
Figure 7B:
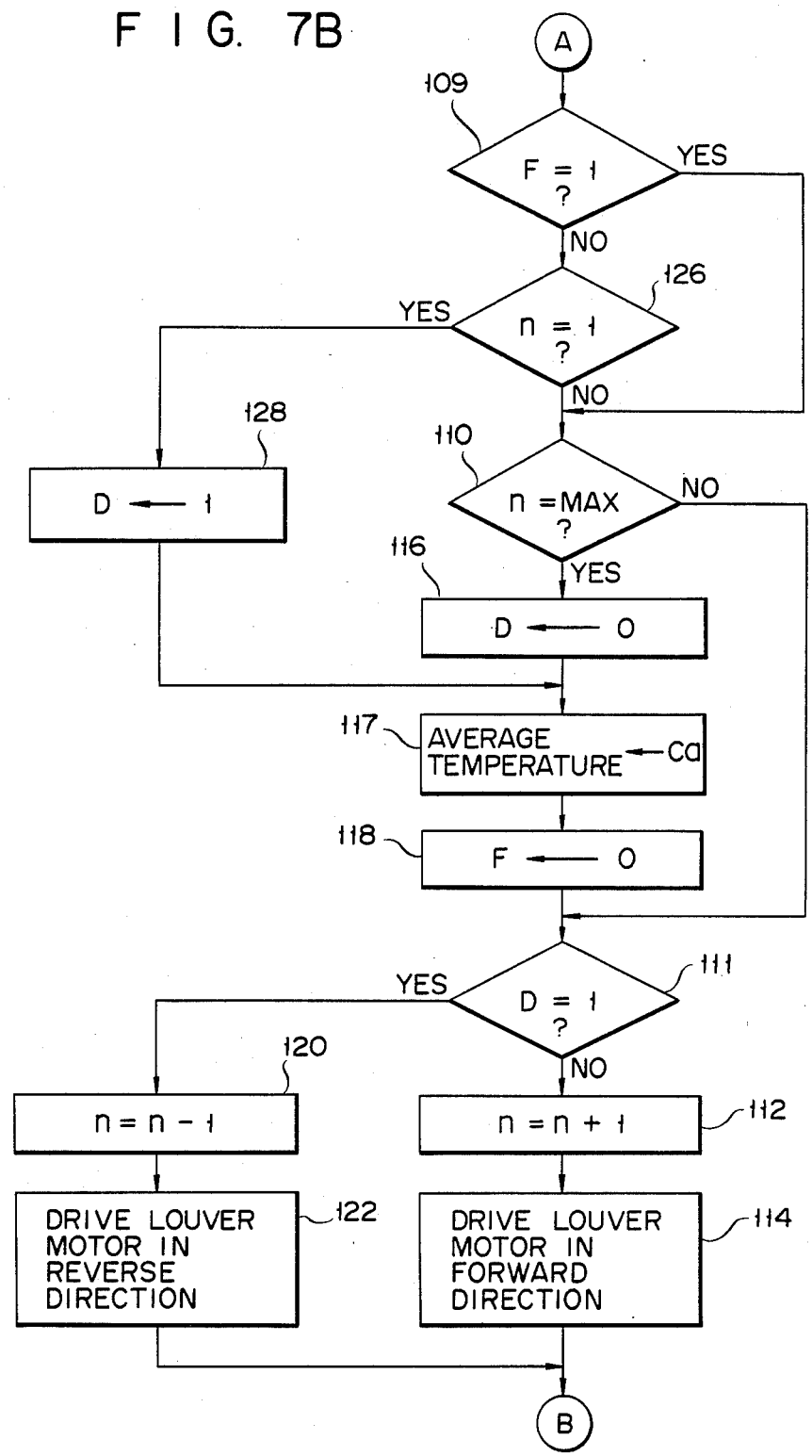

The operation of CPU 49 mentioned above will be described in more detail with reference to the flow charts of FIGS. 7A and 7B.

After the correction data is stored in memory 52, the temperature control mode is started in step 100. An initialize signal is generated by CPU 49 and step motor 24 is operated in step 101 so that all vanes 16 of louver 15 are directed toward area $X_1$ and sensor 31 is also directed toward area $X_1$. In step 102, CPU 49 is completely initialized. More specifically, in a first cycle of temperature control, data F=1 is stored in a first memory area of memory 52, and sensor 31 is directed toward area $X_1$. Thus, data n=1 is stored in a second memory area of memory 52. Vanes 16 of louver 15 are swung along a forward direction in an odd cycle of temperature control and along a reverse direction in an even cycle of temperature control. Therefore, data D=1 is stored in a third memory area of memory 52.

In steps 103 and 104, sensor data is supplied from sensors 32 and 31 to memory 52, and in step 105, temperature $C_1$ of area $X_1$ is calculated by CPU 49 from the supplied data. It is checked in step 106 whether the temperature control cycle is in the first cycle, i.e., whether F=1. In other words, it is checked whether data relating to the temperatures of all the areas has already been collected. If F=1 in step 106, louver 15 is directed to the respective areas for the same period of time $T_n$ in the first cycle. Therefore, $T_n=T_0$ is set in step 107. Louver 15 is then directed to area $X_1$ for a period of time $T_0$, which is measured by CPU 49 in step 108. When time $T_O$ elapses, it is checked again in step 109 whether F=1. If YES in step 109, it is checked in step 110 whether n is the maximum value e.g., 7. Since n=1 as mentioned above, NO in step 110. It is then checked in step 111 whether louver 15 is to be swung along a forward direction (D=0) or a reverse direction (D=1). If NO in step 111, data n is updated in step 112 to n=n+1. Since D=1 is set in step 102, motor 24 is driven along a forward direction in step 114 so that louver 15 is swung along a forward direction and that sensor 31 is directed toward area $X_2$. Temperature detection of area $X_1$ in the first cycle is thus completed.

When sensor 31 is directed toward area $X_2$, the flow returns to steps 103 and 104. Then, in step 105, temperature $C_1$ of area $X_2$ is calculated. Similar steps as mentioned above are repeated to sequentially update data n. When n reaches the maximum value, that is, when sensor 31 is directed toward area $X_n$, it is determined in step 110 that n is the maximum value. D=0 is then set in step 116. In step 117, average temperature $C_a=(C_1+C_2+ \ldots +C_n)/n$ of previously calculated temperatures $C_1, C_2, \ldots C_n$ is calculated, and in step 118, F=0 is set. It is checked again in step 111 whether D=0. Since YES in step 111, n is decremented (n=n−1) in step 120, and motor 24 is driven along a reverse direction in step 122 so that louver 15 is swung along a reverse direction. In steps 103, 104 and 105, temperatures $C_n$ of the respective areas after the first cycle are calculated. In step 124, wait time Tn, during which louver 15 is directed to the respective area $X_n$, is calculated from the average room temperature calculated in the previous cycle and calculated temperature $C_n$ of area $X_n$. Louver 15 is thus directed to area $X_n$ during calculated wait time Tn. After the second cycle, it is checked in step 126 whether n=1. If YES in step 126, D is changed in step 128. This subroutine continues to update the cycle.

A case of n (number of areas)=5 is shown in the following Table I. In Table I, the time required for one cycle, i.e., the time after louver 15 is directed toward area $X_1$ and before it is directed toward area $X_5$ is set to be 20 seconds. The time required for motor 24 to switch louver 15 from area $X_n$ to next area $X_{n+1}$ is set to be substantially 5 seconds. As is apparent from Table I, louver 15 is directed to a high temperature area for a longer period of time than to other areas.

TABLE I

| Area n | 1 | 2 | 3 | 4 | 5 |
| --- | --- | --- | --- | --- | --- |
| Detected Temperature Cn | 16° C. | 18° C. | 20° C. | 24° C. | 22° C. |
| Average Room Temperature Ca | (Average of previous temperatures Cn) 20° C. | | | | |
| Ratio of Detected Temperature to Average Temperature Cn/Ca | 0.8 | 0.9 | 1.0 | 1.2 | 1.1 |
| Wait time | 24 sec (20 × 1.2) | 22 sec (20 × 1.1) | 20 sec (20 × 1.0) | 16 sec (20 × 0.8) | 18 sec (20 × 0.9) |
| Louver Movement | sensor | | | | |

As described above, according to the embodiment of the present invention, a temperature detecting means utilizing infrared rays is provided in an air conditioning apparatus. The temperature distribution in room 1 is automatically detected by the temperature detecting means and a temperature correcting means, and the amount of air flow discharged from the main frame toward each area in the room is controlled. Thus, the temperatures of the respective areas in a room to be air conditioned can be made uniform, thereby creating a comfortable ambient temperature. The apparatus of the present invention is easy to handle since the temperature distribution is detected automatically. Cold or warm air generated by the main frame is effectively used to set the temperatures of the respective areas of the room uniform, so that operation efficiency is improved. Temperature control described above is enabled without providing sensors and so on in the respective portions of the room. Therefore, the floor space of the room is not limited, and the above-mentioned effects can be obtained. In this embodiment, a drive source for driving the infrared ray detector is also used for driving the louver, simplifying the arrangement of the apparatus.

Figure 8A:
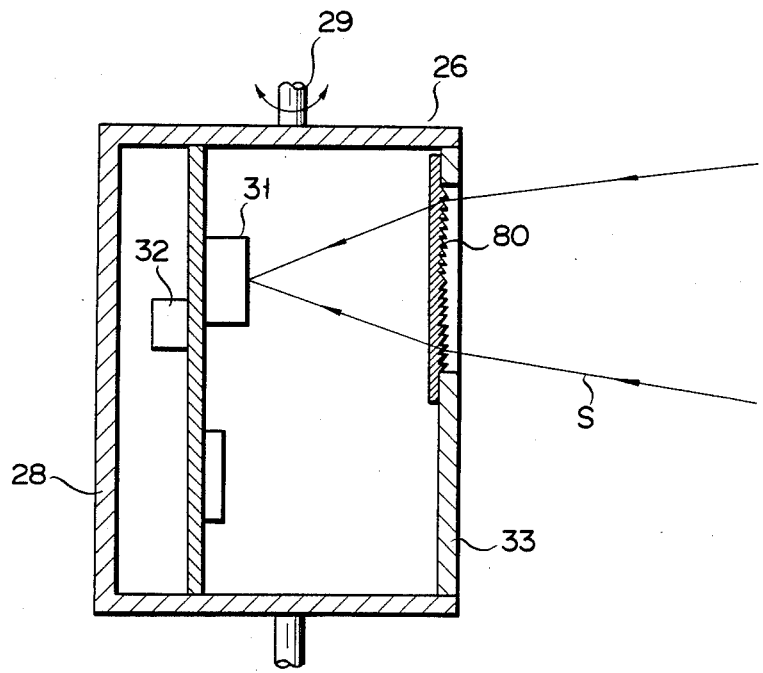
FIG. 8A is a schematic sectional view of an another detection unit.
Figure 8B:
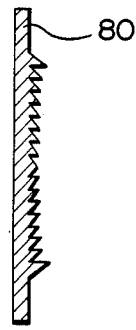
FIG. 8B is a schematic sectional view of the lens unit shown in FIG. 8A.

The present invention is not limited to the abovedescribed embodiment and various changes and modifications can be made. The infrared ray detection unit 26 may be constructed as shown in FIG. 8A which shows a modification of the detection unit 26 shown in FIG. 4. In the infrared ray detection unit shown in FIG. 4, infrared rays S emitted from the respective areas in the room are converged by the concave mirror 30 onto the infrared ray sensor 31. However, in the infrared ray detection unit shown in FIG. 8A, in which the infrared sensor 31 is arranged at a rear position of the slit formed in the window member 33 for confining the sensing area of the sensor 31 and the slit is covered by a Fresnel lens shown in FIG. 8B, infrared rays S emitted from the respective areas in the room are also converged by the Fresnel lens onto the infrared ray sensor 31. In the above embodiment, the present invention is applied to an air conditioning apparatus for performing both cooling and heating. However, the present invention can be applied to a cooler or a heater. The present invention can also be applied to an apparatus in which an indoor unit and an outdoor unit are integrally combined, and which is installed such that the outdoor unit is exposed to outside the room. Furthermore, the indoor unit is not limited to a wall-type unit. A drive source for driving the infrared ray detector and that for driving the air discharge section, i.e., the louver, can be provided separately.

In the embodiment described above, the temperatures of the respective areas in the room is set uniform by an air conditioning system. However, correction data supplied to the CPU can be adjusted so as to decrease the temperature of the area where a user usually spends most of the day, e.g., around a sofa, than those of the remaining areas. In the above embodiment, the time during which the louver is directed to a particular area is variable. However, the amount of air flow can be made variable for respective areas, thereby controlling the temperatures of the respective areas. In short, the heating/cooling efficiency can be changed for the respective areas, thereby controlling the temperatures of the respective areas.

What is claimed is:

1. A system for conditioning the air of a room, comprising:
    means for discharging warm or cold air and directing the discharged air to various areas of the room;
    means provided with a restricted field of view for sweeping the room within the restricted field of view, said sweeping means being coordinated with said air discharging means so that said warm or cold air is being directed in the same direction to which said sweeping means is directed;
    means for detecting thermal radiation in the areas of the room within the restricted field of view of said sweeping means and generating first detection signals which correspond to a temperature distribution of the room; and
    means for adjusting the amount of warm or cold air directed toward the respective areas from said air discharging means in accordance with the first detection signals.

2. A system according to claim 1, wherein said thermal radiation detecting means comprises an infrared ray sensor.

3. A system according to claim 1, further comprising second means provided in the vicinity of said thermal radiation detecting means for detecting a temperature in the vicinity thereof and for generating a second detection signal.

4. A system according to claim 3, wherein said air adjusting means comprises means for calculating the temperatures of the respective areas of the room from the first and second detection signals.

5. A system according to claim 3, wherein said air adjusting means comprises means for generating a preset correction signal and means for calculating the temperatures of the respective areas of the room from the preset correction signal and the first and second detection signals.

6. A system according to claim 1, wherein said air discharging means comprises means for sequentially sweeping the room with an air stream.

7. A system according to claim 1, wherein said sweeping means is directed in a substantially horizontal direction.

8. A system according to claim 1, wherein said air discharging means comprises
    a discharge section for discharging an air stream; and
    means for swinging and changing a direction of said discharge section for sweeping the respective areas with said air stream.

9. A system according to claim 8, wherein said air adjusting means adjusts a time during which said discharge section is directed toward the respective areas of the room.

* * * * *